(12) United States Patent
O'Sullivan

(10) Patent No.: US 10,189,977 B2
(45) Date of Patent: Jan. 29, 2019

(54) PACK FOR ANAEROBIC PRODUCTS

(71) Applicant: Henkel IP & Holding GmbH, Duesseldorf (DE)

(72) Inventor: Peter O'Sullivan, Kilcock (IE)

(73) Assignee: Henkel IP & Holding GmbH, Duesseldorf (DE)

( * ) Notice: Subject to any disclaimer, the term of this patent is extended or adjusted under 35 U.S.C. 154(b) by 0 days.

(21) Appl. No.: 15/424,980

(22) Filed: Feb. 6, 2017

(65) Prior Publication Data

US 2017/0145196 A1 May 25, 2017

Related U.S. Application Data

(63) Continuation of application No. PCT/EP2014/066948, filed on Aug. 6, 2014.

(51) Int. Cl.
| | |
|---|---|
| *C08L 23/06* | (2006.01) |
| *C08J 5/00* | (2006.01) |
| *B65D 35/38* | (2006.01) |
| *B65D 35/44* | (2006.01) |
| *B65D 85/00* | (2006.01) |

(52) U.S. Cl.
CPC ............ *C08L 23/06* (2013.01); *B65D 35/38* (2013.01); *B65D 35/44* (2013.01); *B65D 85/00* (2013.01); *C08J 5/00* (2013.01); *C08J 2323/06* (2013.01); *C08J 2403/00* (2013.01); *C08J 2403/02* (2013.01); *C08L 2203/10* (2013.01); *C08L 2207/04* (2013.01); *C08L 2207/066* (2013.01)

(58) Field of Classification Search
CPC ............... C08L 23/06; C08L 2207/04; C08L 2207/066; C08L 2203/10; B65D 35/38; B65D 35/44; B65D 85/00; B65D 77/062; C08J 5/00; C08J 5/18; C08J 2430/02; C08J 2403/00; C08J 2323/06
See application file for complete search history.

(56) References Cited

U.S. PATENT DOCUMENTS

| | | | |
|---|---|---|---|
| 4,215,209 A | 7/1980 | Meier et al. | |
| 5,605,999 A * | 2/1997 | Chu | ................ C08F 290/148 |
| | | | 526/279 |

(Continued)

FOREIGN PATENT DOCUMENTS

| | | |
|---|---|---|
| EP | 1400464 | 3/2004 |
| GB | 2186544 | 8/1987 |

(Continued)

OTHER PUBLICATIONS

International Search Report issued in connection with International Patent Application No, PCT/EP2014/066948 dated Apr. 15, 2015.

*Primary Examiner* — Frederick C Nicolas
*Assistant Examiner* — Bob Zadeh
(74) *Attorney, Agent, or Firm* — Steven C. Bauman

(57) ABSTRACT

A pack comprising: a container, the container having a container body, and the container body being sufficiently oxygen permeable to prevent an anaerobically curable composition held therein from curing due to absence of oxygen; and an anaerobically curable composition held within the container is provided. The container body is constructed from a plastics material which is formed from a blend of a thermoplastic starch component and a polyethylene.

19 Claims, 2 Drawing Sheets

(56) References Cited

U.S. PATENT DOCUMENTS

| | | | | |
|---|---|---|---|---|
| 6,391,993 B1* | 5/2002 | Attarwala | ............... | C09J 4/00 |
| | | | | 526/261 |
| 6,502,697 B1* | 1/2003 | Crampton | ............ | B65D 65/38 |
| | | | | 206/484 |
| 7,722,940 B2* | 5/2010 | Schwantes | ............. | B01J 13/02 |
| | | | | 264/4.7 |
| 2004/0185283 A1* | 9/2004 | White | ................. | C08G 63/06 |
| | | | | 428/480 |
| 2008/0249212 A1 | 10/2008 | Sigworth et al. | | |
| 2010/0311874 A1 | 12/2010 | Mentink et al. | | |
| 2012/0009387 A1* | 1/2012 | Wang | ..................... | C08J 5/18 |
| | | | | 428/141 |
| 2012/0010364 A1* | 1/2012 | Schwantes | ............. | B01J 13/02 |
| | | | | 525/57 |
| 2015/0118470 A1* | 4/2015 | Soliman | ................ | C08L 3/00 |
| | | | | 428/220 |
| 2015/0174867 A1* | 6/2015 | Neuman | ............. | B65D 65/463 |
| | | | | 428/451 |
| 2016/0257098 A1* | 9/2016 | Nissenbaum | ......... | B65D 65/46 |
| 2016/0297186 A1* | 10/2016 | Soliman | ............... | B32B 27/32 |
| 2017/0145196 A1* | 5/2017 | O'Sullivan | .............. | C08J 5/00 |

FOREIGN PATENT DOCUMENTS

| | | |
|---|---|---|
| JP | H06-340771 | 12/1994 |
| JP | 2002-507955 | 3/2002 |
| JP | 2010-523765 | 7/2010 |
| RU | 2523310 | 7/2014 |
| WO | 9902424 | 1/1999 |
| WO | 2007004203 | 1/2007 |
| WO | 2011020170 | 2/2011 |
| WO | 2012162092 | 11/2012 |
| WO | 2014028977 | 2/2014 |

* cited by examiner

PACK FOR ANAEROBIC PRODUCTS

FIELD OF THE INVENTION

The present invention relates to a pack for anaerobic products such as anaerobic sealants and adhesives. Of particular interest are liquid anaerobic products. Anaerobic products cure, set-up or polymerise in the absence of oxygen (air).

BACKGROUND TO THE INVENTION

The term anaerobic as used here is used to refer to formulations which cure, set-up or polymerise in the absence of air. Included are acrylic type systems including acrylate and methacrylate based compositions. This includes structural anaerobic materials.

Applications include those that require tensile bonding strength; torsional bonding strength (e.g. thread-locking formulations) etc.

Many types of container for anaerobic products have been produced. These include bottles, bag-in-box containers, etc.

One of the key considerations in packing an anaerobic adhesive is storage stability. Storage stability is compromised if there is not sufficient oxygen present through the mass of the composition to prevent curing occurring. Typically this means that not all materials are suitable for use in the manufacture of containers for holding anaerobically curable products.

Furthermore, there may also be compatibility issues. For example, a component of an anaerobically curable composition and a component of the material of the container body may be incompatible with each other. For example, some materials may cause deleterious effects on the chemical and/or physical properties of an anaerobically curable composition.

Accordingly, there is always a demand for alternative materials for use in the manufacture of containers for holding anaerobically curable products.

In particular there is a demand for alternative packs comprising a container and an anaerobically curable product held therein, which exhibit suitable storage stability.

SUMMARY OF THE INVENTION

In one aspect, the present invention provides a pack comprising:
 (i) a container, the container having a container body, and the container body being sufficiently oxygen permeable to prevent an anaerobically curable composition held therein from curing due to absence of oxygen; and
 (ii) an anaerobically curable composition held within the container;
wherein the container body is constructed from a plastics material which is formed from a blend of a thermoplastic starch component and a polyethylene.

This is desirable as an alternative material for forming the container body. It has desirable characteristics. Furthermore, the starch used in the thermoplastic starch component may be sourced from a renewable source.

The material has been found to be compatible with a wide range of formulations of anaerobically curable materials.

The material exhibits desirable characteristics for storing anaerobically curable products. In particular, it has been found that the performance of the material which forms the container body is comparable to that of more conventional materials.

Furthermore, the material is versatile. For example, it can be sufficiently rigid to form a container in the form of a bottle. A squeezable version of the container body can be formed. For example, the container body may be in the form of a squeezable container optionally fitted with a dispensing arrangement such as a dispensing nozzle. For example a dispensing assembly comprising a cap and a nozzle may be provided.

A pack of the invention has been found to demonstrate good storage stability properties which make it suitable for constructing different types of container.

Furthermore, a wide range of blends of material may be utilised.

For example, the starch in the thermoplastic starch component may be present in an amount from 6% to 33% of the weight of the blend used to form the container body.

The starch in the thermoplastic starch component may be present in an amount from 13% to 32% of the weight of the blend used to form the container body. Optionally, the thermoplastic starch is present in an amount from 20% to 30% of the weight of the blend used to form the container body. For example, the starch in the thermoplastic starch component may be present in an amount from 23% to 30% of the weight of the blend used to form the container body.

The starch in the thermoplastic starch component may be present in an amount of about 26% of the weight of the blend used to form the container body.

The starch in the thermoplastic starch component may be utilised in the form of a thermoplastic starch component. That is it the starch may be utilised in conjunction with one or more other materials. For example the thermoplastic starch component may be a starch that is blended with a plasticiser. This may be desirable to make the starch more easily blendable. For example, it is desirable that the thermoplastic starch component is blendable with non-starch materials such as (thermo)plastic materials. Desirably the starch is from a natural source.

Any suitable plasticiser may be used. For example a polyfunctional alcohol or combination of polyfunctional alcohols can be used. Suitable polyfunctional alcohols include glycerol and sorbitol and combinations thereof.

Within the thermoplastic starch component a compatabiliser may also be utilised to compatibilise the starch component with a polymer with which it is to be blended. For example the compatabiliser utilised may make the thermoplastic starch component compatible with polyethylene. For example the compatabiliser could be a polymer with groups that are compatible with the starch and groups that are compatible with the thermoplastic with which it is blended. Copolymers where one monomer is of a similar in nature to a polymer (with which the starch is) to be compatibilised and where a copolymerized co-monomer is compatible with the starch, for example reactive with the starch such as reactive with hydroxyl groups of the starch are desirable. In this respect grafted or random co-polymers may be used where the polymer backbone is of a monomer which is compatible with the polymer and the co-monomer is attached as pendant groups to the backbone.

For the present invention it is desirable that any compatibiliser has a backbone that is compatible with polyethylene. For example the backbone may be a polyethylene backbone. Any suitable pendant co-monomer can be used. Carboxylic acids, carboxylic acid anhydrides and esters of acrylic acid can be used as co-monomers. One suitable compatibiliser within the present invention is polyethylene-co-acrylic-acid.

For ease of blending the starch and optionally plasticiser may be pre-blended with an amount of polymer to which it is to be later blended. For example a thermoplastic starch component may be blended with polyethylene.

The process described and claimed in International Patent Publication WO 2011/020170 is suitable for preparing a thermoplastic starch of the invention.

To the extent, that in use, a thermoplastic starch component comprising components beyond the starch component is used the values given herein for the amount of starch refers to the starch only and does not include such other components.

For example, the polyethylene may be present in an amount from 66% to 94% of the weight of the blend used to form the container body. Optionally, the polyethylene is present in an amount from 67% to 87% of the weight of the blend used to form the container body. The polyethylene may be present in an amount from 70% to 80% of the weight of the blend used to form the container body. For example, the polyethylene may be present in an amount of about 74% of the weight of the blend used to form the container body.

To the extent that polyethylene is utilised in the thermoplastic starch component the values given herein for the amount of polyethylene refers to the overall amount of polyethylene that is present in the container. (For the avoidance of doubt that amount does not include any copolymer of polyethylene that may be present for example as compatabiliser).

The oxygen permeability of the container body is at least 2.4 $cm^3$ in 24 hours based on a wall thickness of 4 mm.

A pack of the invention can accommodate materials over a good range of viscosities. For example, the viscosity of the anaerobically curable composition may be from about 10 centipoise to about 8,000 centipoise.

Suitably the polyethylene is an LDPE-based material.

If desired, the blend from which the container body is formed may comprise a plasticiser.

As mentioned above, for some end-use applications, it is desirable that the container body is squeezable for dispensing the anaerobically curable composition. For example it may take the form of a squeezable bottle.

The container may further comprise a dispensing nozzle, optionally forming part of a closure for the container body, for dispensing anaerobic product from the container.

The container may further comprise a dispensing closure for dispensing anaerobic product from the container. Such a closure may incorporate a nozzle.

The container body may be coloured by a pigment. For example a pigment may be blended with the components forming the container body. This can be done without compromising the storage stability of the product contained therein.

The anaerobically curable material may comprise a monomer selected from the group consisting of (meth)acrylates, thiolenes, siloxanes, vinyls and, of course, combinations thereof.

The anaerobically curable monomer may be a (meth) acrylate monomer. (Meth)acrylate monomers suitable for use as a (meth)acrylate component in an anaerobically curable composition may be chosen from a wide variety of materials, such as these represented by $H_2C=CGCO_2R_1$, where G may be hydrogen, halogen or alkyl groups having from 1 to about 4 carbon atoms, and $R_1$ may be selected from alkyl, cycloalkyl, alkenyl, cycloalkenyl, alkaryl, aralkyl or aryl groups having from 1 to about 16 carbon atoms, any of which may be optionally substituted or interrupted as the case may be with silane, silicon, oxygen, halogen, carbonyl, hydroxyl, ester, carboxylic acid, urea, urethane, carbonate, amine, amide, sulfur, sulfonate, sulfone and the like.

Additional (meth)acrylate monomers suitable for use in a pack of the invention include polyfunctional (meth)acrylate monomers, such as, but not limited to, di- or tri-functional (meth)acrylates like polyethylene glycol di(meth)acrylates, tetrahydrofuran (meth)acrylates and di(meth)acrylates, hydroxypropyl (meth)acrylate ("HPMA"), hexanediol di(meth)acrylate, trimethylol propane tri(meth)acrylate ("TMPTMA"), diethylene glycol dimethacrylate, triethylene glycol dimethacrylate ("TRIEGMA"), tetraethylene glycol dimethacrylate, dipropylene glycol dimethacrylate, di-(pentamethylene glycol) dimethacrylate, tetraethylene diglycol diacrylate, diglycerol tetramethacrylate, tetramethylene dimethacrylate, ethylene dimethacrylate, neopentyl glycol diacrylate, trimethylol propane triacrylate and bis-phenol-A mono and di(meth)acrylates, such as ethoxylated bisphenol-A (meth)acrylate ("EBIPMA"), and bisphenol-F mono and di(meth)acrylates, such as ethoxylated bisphenol-F (meth)acrylate.

Still other (meth)acrylate monomers that may be used herein include silicone (meth)acrylate moieties ("SiMA"), such as those taught by and claimed in U.S. Pat. No. 5,605,999 (Chu), the disclosure of which is hereby expressly incorporated herein by reference.

Of course, combinations of monomers, such as combinations of (meth)acrylate monomers, may also be used.

The (meth)acrylate component should comprise from about 10 to about 90 percent by weight of the composition, such as about 60 to about 90 percent by weight, based on the total weight of the composition.

BRIEF DESCRIPTION OF THE DRAWINGS

Embodiments of the invention will be described, by way of example only, with reference to the accompanying drawings in which.

DETAILED DESCRIPTION OF THE DRAWINGS

Figure 1:
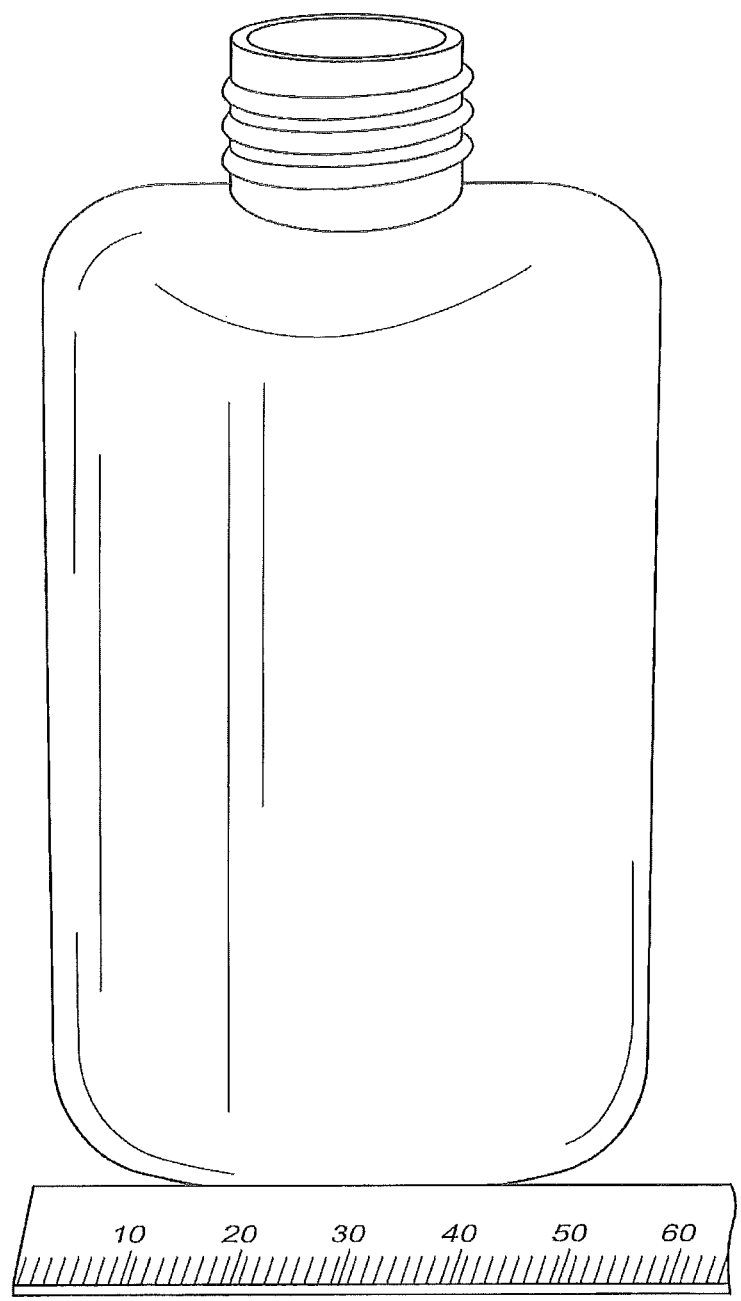
FIG. 1 is an image of (red) coloured 50 ml bottle made and tested in the experimental below.

FIG. 1 shows an image (photo) of a (red) coloured 50 ml bottle made and tested in the experimental below. A ruler is included in the image to give an indication of scale. (A similar bottle was made to hold 250 ml of product as set out below.)

A blend of polyethylene and a thermoplastic starch were utilised to form container bodies. Thereafter packs were formed utilising the container bodies and a closure for the container. Specifically anaerobically curable adhesive was placed in the container. The containers were found to demonstrate comparable storage stability to that demonstrated by a comparable container formed from PE alone.

All Loctite® products are available from Henkel Ireland, Tallaght Business Park, Whitestown, Tallaght, Dublin 24.

The following is a discussion of the creation of packs, tests carried out and the results of those tests:

EXPERIMENTAL

Packs which are in the form of bottles with anaerobic curable adhesive located therein are sold with what is often termed a "minimum" product fill volume—the containers are not filled to the top, rather a substantial headspace is left in the container. For example packs have been sold with respective fills of 50 ml & 250 ml of anaerobic product even though the containers themselves have a much greater capacity for example internal volumes of approximately 106 ml & 445 ml respectively. The additional headspace is required in order to keep the products stable via access to oxygen.

Existing bottles in both sizes made from 100% LDPE and alternatives made up of 60% of the same LDPE and 40% Cardia BLF02 (Cardia BL-F02 is a commercially available blend of thermoplastic starch and polyethylene—available from Cardia Bioplastics Unit 18/35 Dunlop Road Mulgrave, Victoria 3170, Australia) had 50 ml or 250 ml of product placed therein. The products for which specified tests were conducted are Loctite® products 270, 243, 242, 278, 290, 542, 549, 601, 638, 648, 649, 2700, 2400, and 6300 as indicated in Table 1 below.

Cardia BL-F02 is a thermoplastic starch material comprising starch; glycerol; sorbitol; polyethylene-co-acrylic-acid and polyethylene. Cardia BL-F02 is approximately (by weight) 66% starch, 30% polyethylene, and the remaining 4% is glycerol; sorbitol; and polyethylene-co-acrylic-acid.

The bottles were sealed with closures after filling.

Bottles were produced by a two cavity mould on a twin head extrusion blow moulding machine. The bottles made utilising the 40% Cardia BLF02 had the following dimensions and had 50 ml of anaerobic product placed inside:

| 50 ml | | | | | | | |
|---|---|---|---|---|---|---|---|
| Cardia 40% trial | 21.01.14 | | | Cavity number | | 430.1 | 430.2 |
| Overall Height | | 106.00 | ± | 1.00 | mm | 105.95 | 106.00 |
| Overall Width | | 57.20 | ± | 1.00 | mm | 57.65 | 57.69 |
| Overall Depth | | 28.00 | ± | 1.00 | mm | 28.26 | 28.30 |
| Neck Height | | 13.70 | ± | 0.40 | mm | 13.75 | 13.76 |
| "T" Dimension | Outside | 23.10 | ± | 0.20 | mm | 23.11 | 23.10 |
| "T" Ovality | Threads | | 0.40Max | | mm | 0.27 | 0.31 |
| "E" Dimension | Inside | 21.10 | ± | 0.20 | mm | 21.11 | 21.23 |
| "E" Ovality | Threads | | 0.40Max | | mm | 0.21 | 0.19 |
| "I" Dimension | Internal | 17.70 | ± | 0.20 | mm | 17.72 | 17.70 |
| "I" Ovality | Neck | | 0.40Max | | mm | 0.21 | 0.20 |
| "S" Dimension | Thread Start | 1.70 | ± | 0.40 | mm | 1.39 | 1.42 |
| Thread Pitch | | 3.00 | ± | 0.10 | mm | 2.98 | 2.98 |
| Thread Height | | 2.00 | ± | 0.10 | mm | 2.06 | 2.07 |
| Wall Thickness (Min) | | 0.25 | | | | 0.47 | 0.44 |
| Leak Test | | P/F | | | | Pass | Pass |
| Brimfull Capacity | | 107.00 | ± | 6.00 | ml | – | – |
| Bottle Weight | | 13.00 | ± | 1.50 | gm | 14.50 | 14.39 |
| Dishing | | | | Max top | | 28.37 | 28.50 |
| | | | | Min | | 28.08 | 28.18 |
| | | | | Max base | | 28.33 | 28.23 |
| | | | | D | | 0.14 | 0.09 |

The bottles made utilising the blend with 40% Cardia BLF02 had the following dimensions and had 250 ml of anaerobic product placed inside:

| 250 ml | | | | | | |
|---|---|---|---|---|---|---|
| Cardia 40% trial | 21.01.14 | | | Cavity number | | 429.10 |
| Overall Height | | 169.60 ± | 2.50 | | mm | 169.95 |
| Overall Width | | 91.50 ± | 1.50 | | mm | 91.86 |
| Overall Depth | | 45.00 ± | 1.00 | | mm | 45.39 |
| Neck Height | | 14.20 ± | 0.40 | | mm | 14.15 |
| "T" Dimension | Outside | 23.10 ± | 0.20 | | mm | 23.16 |
| "T" Ovality | Threads | | 0.40 Max | | mm | 0.10 |
| "E" Dimension | Inside | 21.10 ± | 0.20 | | mm | 21.24 |
| "E" Ovality | Threads | | 0.40 Max | | mm | 0.17 |
| "I" Dimension | Internal | 17.70 ± | 0.20 | | mm | 17.71 |
| | Neck | | 0.40 Max | | mm | 0.07 |
| "S" Dimension | Thread Start | 1.70 ± | 0.40 | | mm | 1.52 |
| Thread Pitch | | 3.00 ± | 0.10 | | mm | 2.98 |
| Thread Height | | 2.00 ± | 0.05 | | mm | 2.05 |
| Wall Thickness (Min) | | 0.25 | | | mm | 0.58 |
| Leak Test | | P/F | | | | Pass |
| Brimfull Capacity | | 445.00 ± | 10.00 | | ml | – |
| Bottle Weight | | 36.00 ± | 1.50 | | gm | 36.47 |
| Dishing | | | Max top | | | 45.08 |
| | | | Min | | | 45.12 |
| | | | Max base | | | 45.25 |
| | | | D | | | 0.02 |

Filled samples were then subjected to both accelerated (35° C. & 45° C./98% relative humidity) and real time (22° C.—often referred to generically as room temperature, RT) ageing test programs as follows:

4 wks @ 45° C./98% RH
8 wks @ 35° C.
16 wks @ 35° C.
6 mths @ 22° C.
12 mths @ 22° C.
18 mths @ 22° C.
24 mths @ 22° C.

Length of real time ageing at 22° C. is dependent on shelf life of product, which in most cases is 24 mths.

The products and their specific test points are set out in Table 1 below. (At the time of filing this application the 18 and 24 months testing were still ongoing, but performance to date is similar to that of conventional LDPE bottles.) The products and their test results are set out in Table 2 below. A performance result equivalent to an LDPE bottle is considered to be a positive result.

Once test points are completed both sets of bottles are examined and visually compared for any evidence of gelling of product and/or deterioration of packaging and/or evidence of leakage.

Then samples were tested to ensure that required performance was being met. For this standard test methods STM-754, STM-8, STM-701 & STM-734 were used.

Unfilled bottles were subjected to Flexibility testing & Oxygen Transmission Rate measurements in comparison with LDPE & HDPE. They were also measured dimensionally to ensure they were within specification as indicated in the tabulated dimensions for each bottle.

Oxygen Transmission testing (OTR) was determined in accordance with ASTM F1307-02 using Mocon Oxtran 2/21 equipment with a coulometric sensor. The bottles were mounted such that the inside was purged for 12 hrs by a stream of nitrogen while the outside was exposed to air (20.8% Oxygen) at 23° C., 50% RH. The bottles were tested using the converge mode. Equilibrium is established when the current transmission rate is less than 1% difference between the transmission rate obtained 5 cycles (30 minute/cycle) previous to the current transmission rate.

The result is quoted for 100% Oxygen. Four samples were tested for each bottle type. The integrity of the mounted bottles were checked prior to test using an Ai Leakmeter 120 electron-capture gas detector. The results are as follows.

|  | O2 transmission rate (cc/pack day to 100% O2) |  |  |  | Average |
| --- | --- | --- | --- | --- | --- |
| Purell LDPE | 2.78 | 2.85 | 2.55 | 2.7 | 2.7 |
| Marlex HDPE | 1.34 | 1.64 | 1.45 | 1.63 | 1.5 |
| Cardia BLF02 40%/Purell LDPE 60% | 2.66 | 2.46 | 1.66 | 2.69 | 2.4 |

Purell is a brand name for product available from Lyondell Bassell, Houston, Tex., USA.

Marlex is a brand name for product available from Phillips Chemical International N.V., Overijse, Belgium.

Flexibility of bottles was determined on a TA-XT2i Stable Microsystems Texture Analyser using a P/2N stainless steel probe. Test speed was set at 0.5 mm min and distance from central position was set at 6.5 mm. Bottle was laid flat on the plate in horizontal position with the probe facing down in vertical orientation. Connected probe was set at a starting position where no load is being applied to the face of the bottle wall. Unit was run at test speed until target distance was reached and graph produced of output values (Force/Kg) versus distance to compare the flexibility. Three samples of each bottle type was measured.

Figure 2:
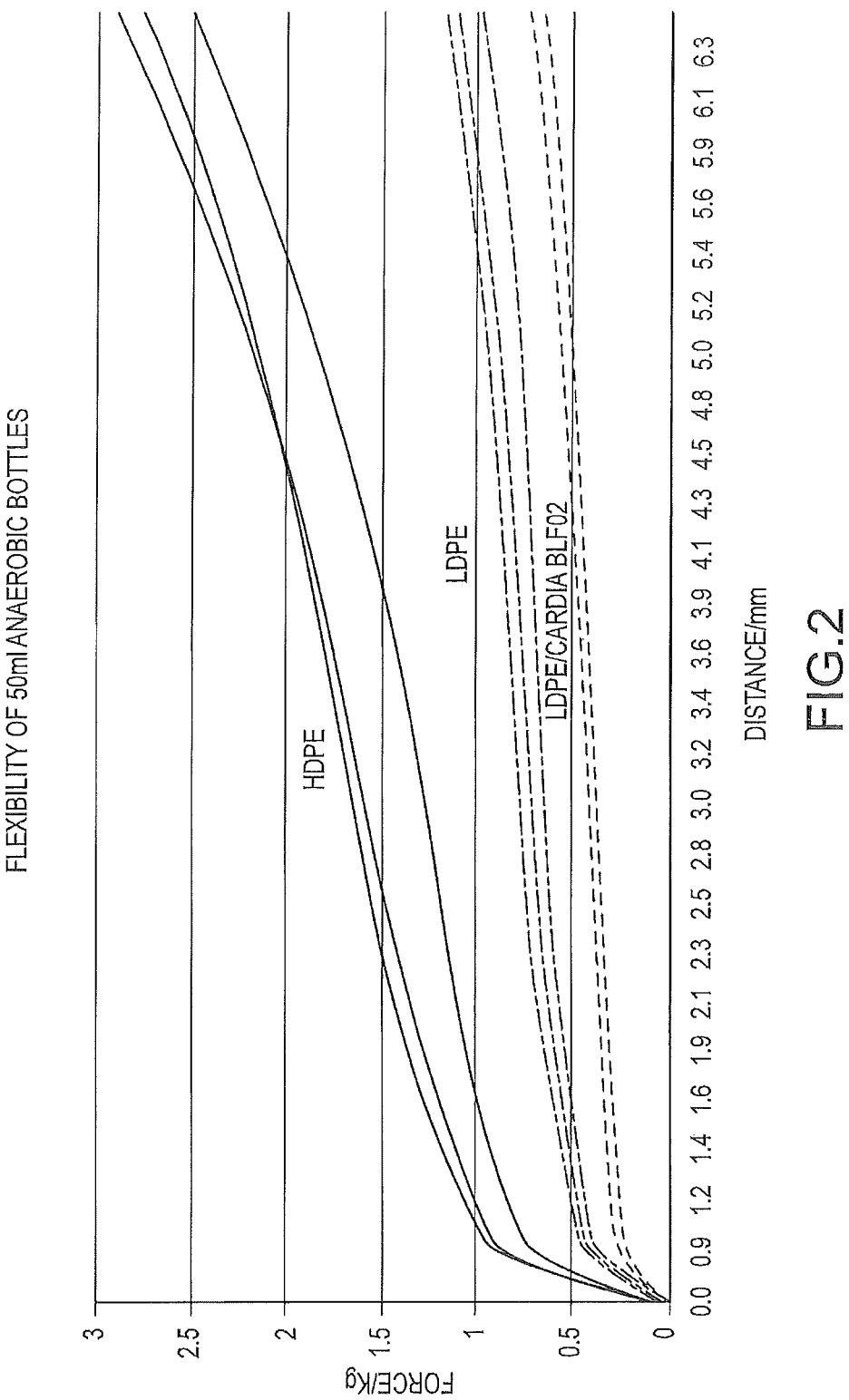
FIG. 2 is a graph showing the results of flexibility testing that was conducted on a bottle such as that shown in FIG. 1 and as set out below.

The results of this testing for a 50 ml bottle are set out in FIG. 2. The 250 ml bottle was assumed to have equivalent oxygen transmission.

TABLE 1

| Product | Test points |
| --- | --- |
| Loctite 270 | All test points |
| Loctite 243 | All test points |
| Loctite 242 | 6 & 12 mths @ 22° C. only |
| Loctite 278 | 6 & 12 mths @ 22° C. only |
| Loctite 290 | All except 6 mths @ 22° C. |
| Loctite 542 | 6 & 12 mths @ 22° C. only |
| Loctite 549 | No 4 wks @ 45° C./98% RH. Shelf life 12 mths @ 22° C. |
| Loctite 601 | All test points |
| Loctite 638 | All except 4 wks @ 45° C./98% RH |
| Loctite 648 | All except 4 wks @ 45° C./98% RH |
| Loctite 649 | All test points up to 12 mths @22° C. (shelf life) |
| Loctite 2700 | All test points up to 18 mths @ 22 C. (shelf life) |
| Loctite 2400 | All test points up to 18 mths @ 22 C. (shelf life) |
| Loctite 6300 | All test points up to 12 mths @22° C. (shelf life) |

TABLE 2

| | Test method | | | | |
| --- | --- | --- | --- | --- | --- |
| Product | STM-754 Shear strength | STM-701 Break Torque | STM-734 Fixture test | STM-8 Stab test | Result |
| Loctite 270 | Mild steel pins & collars | Mild & Stainless steel nuts & bolts | N/A | No | Results within specification and/or equivalent to LDPE bottles |
| Loctite 243 | Mild steel pins & collars | Mild steel nuts & bolts | N/A | No | Results within specification and/or equivalent to LDPE bottles |
| Loctite 242 | N/A | Mild steel nuts & bolts | N/A | No | Results within specification and/or equivalent to LDPE bottles |
| Loctite 278 | Mild steel pins & collars | Zinc phosphate nuts & bolts | Brass nuts & bolts | No | Results within specification and/or equivalent to LDPE bottles |
| Loctite 290 | Mild steel pins & collars | Mild steel nuts & bolts | N/A | No | Results within specification and/or equivalent to LDPE bottles |
| Loctite 542 | Mild steel pins & collars | N/A | N/A | No | Results within specification and/or equivalent to LDPE bottles |
| Loctite 549 | N/A | Mild steel nuts & bolts | N/A | No | Results within specification and/or equivalent to LDPE bottles |
| Loctite 601 | Mild steel pins & collars | Mild steel nuts & bolts | N/A | No | Results within specification and/or equivalent to LDPE bottles |
| Loctite 638 | Mild & stainless steel pins & collars | N/A | N/A | Yes | Results within specification and/or equivalent to LDPE bottles |
| Loctite 648 | Mild steel pins & collars | N/A | N/A | Yes | Results within specification and/or equivalent to LDPE bottles |
| Loctite 649 | Mild steel pins & collars | N/A | N/A | No | Results within specification and/or equivalent to LDPE bottles |
| Loctite 2700 | Mild steel pins & collars | Mild steel nuts & bolts | N/A | No | Results within specification and/or equivalent to LDPE bottles |

TABLE 2-continued

| | Test method | | | | |
|---|---|---|---|---|---|
| Product | STM-754 Shear strength | STM-701 Break Torque | STM-734 Fixture test | STM-8 Stab test | Result |
| Loctite 2400 | Mild steel pins & collars | Mild steel nuts & bolts | N/A | No | Results within specification and/or equivalent to LDPE bottles |
| Loctite 6300 | Mild steel pins & collars | N/A | N/A | No | Results within specification and/or equivalent to LDPE bottles |

CONCLUSION

The bottles prepared according to the experimental above, clearly show that the pack of the invention provides an overall stability which is equivalent to existing packs (such as LDPE). Furthermore, the bottles were shown to be compatible with the contents therein. No issues arose with premature curing/gelling of the product in the container. Furthermore, the containers were slightly easier to squeeze. And this was shown over a wide range of products of differing compositions.

Overall then, the bottles formed from the blending of the thermoplastic starch with LDPE provided the same performance as equivalent 100% LDPE bottles in terms of product stability and compatibility, performance, oxygen transmission and are slightly easier to squeeze.

The words "comprises/comprising" and the words "having/including" when used herein with reference to the present invention are used to specify the presence of stated features, integers, steps or components but do not preclude the presence or addition of one or more other features, integers, steps, components or groups thereof.

It is appreciated that certain features of the invention, which are, for clarity, described in the context of separate embodiments, may also be provided in combination in a single embodiment. Conversely, various features of the invention which are, for brevity, described in the context of a single embodiment, may also be provided separately or in any suitable sub-combination.

What is claimed is:

1. A pack comprising:
   a. a container, the container having a container body; and
   b. an anaerobically curable composition held within the container;
wherein the container body is constructed from plastics material which is formed from a blend of a thermoplastic starch component, wherein the starch in the thermoplastic starch component is present in an amount from 6% to 33% of the weight of the blend used to form the container body and a polyethylene, and which is sufficiently oxygen permeable to prevent the anaerobically curable composition held therein from curing due to absence of oxygen.

2. A pack according to claim 1 wherein the starch in the thermoplastic starch component is sourced from a renewable source.

3. A pack according to claim 1 wherein the starch in the thermoplastic starch component is present in an amount from 13% to 32% of the weight of the blend used to form the container body.

4. A pack according to claim 1 wherein the starch in the thermoplastic starch component is present in an amount from 20% to 30% of the weight of the blend used to form the container body.

5. A pack according to claim 1 wherein the starch in the thermoplastic starch component is present in an amount from 23% to 30% of the weight of the blend used to form the container body.

6. A pack according to claim 1 wherein the starch in the thermoplastic starch component is present in an amount of about 26% of the weight of the blend used to form the container body.

7. A pack according to claim 1 wherein the polyethylene is present in an amount from 66% to 94% of the weight of the blend used to form the container body.

8. A pack according to claim 1 wherein the polyethylene is present in an amount from 67% to 87% of the weight of the blend used to form the container body.

9. A pack according to claim 1 wherein the polyethylene is present in an amount from 70% to 80% of the weight of the blend used to form the container body.

10. A pack according to claim 1 wherein the polyethylene is present in an amount of about 74% of the weight of the blend used to form the container body.

11. A pack according to claim 1 wherein the oxygen permeability of the container body is at least 2.4 $cm^3$ in 24 hours based on a wall thickness of 4 mm.

12. A pack according to claim 1 wherein the viscosity of the anaerobically curable composition is from about 10 centipoise to about 8,000 centipoise.

13. A pack according to claim 1 wherein the polyethylene is LDPE.

14. A pack according to claim 1 wherein the blend from which the container body is formed comprises a plasticiser.

15. A pack according to claim 1 wherein the container body is squeezable for dispensing the anaerobically curable composition.

16. A pack according to claim 1 wherein the container body is a bottle.

17. A pack according to claim 1 wherein the container further comprises a dispensing nozzle, for dispensing the anaerobically curable composition from the container.

18. A pack according to claim 1 wherein the container further comprises a dispensing closure for dispensing the anaerobically curable composition from the container.

19. A pack according to claim 1 wherein the container body is coloured by a pigment.

* * * * *